(12) United States Patent
Rigaldiès et al.

(10) Patent No.: US 11,960,663 B2
(45) Date of Patent: Apr. 16, 2024

(54) RECONFIGURABLE COMPUTER MOUSE

(71) Applicant: Logitech Europe S.A., Lausanne (CH)

(72) Inventors: Andéol Georges Gabriel Rigaldiès, Lausanne (CH); Léo Zeender, Lausanne (CH); Cyril Yves Anthony Drezet, Les Rousses (FR)

(73) Assignee: Logitech Europe S.A., Lausanne (CH)

( * ) Notice: Subject to any disclaimer, the term of this patent is extended or adjusted under 35 U.S.C. 154(b) by 45 days.

(21) Appl. No.: 17/943,481

(22) Filed: Sep. 13, 2022

(65) Prior Publication Data

US 2024/0085994 A1    Mar. 14, 2024

(51) Int. Cl.
*G06F 3/0354* (2013.01)
*G06F 3/0346* (2013.01)

(52) U.S. Cl.
CPC ........ *G06F 3/03543* (2013.01); *G06F 3/0346* (2013.01); *G06F 3/03548* (2013.01)

(58) Field of Classification Search
CPC .......... G06F 3/017; G06F 3/011; G06F 3/013; G06T 7/20; G06T 7/50; G06T 7/70; G06T 2200/24; G06T 2207/30196; G06V 40/28; G06V 10/25

See application file for complete search history.

(56) References Cited

U.S. PATENT DOCUMENTS

| | | | | |
|---|---|---|---|---|
| 6,431,504 B1* | 8/2002 | Ignagni | ................... | G06F 3/039 248/205.3 |
| 7,233,318 B1* | 6/2007 | Farag | ................... | G06F 3/03543 D14/402 |
| 2006/0044270 A1* | 3/2006 | Chen | ................... | G06F 3/03543 345/163 |
| 2007/0139377 A1* | 6/2007 | Chiang | ................. | G06F 3/0362 345/163 |
| 2008/0186279 A1* | 8/2008 | Van Dalen | ............ | G06F 3/0338 345/163 |
| 2015/0286296 A1* | 10/2015 | Wang | ................... | G06F 3/03543 345/163 |

* cited by examiner

*Primary Examiner* — Bryan Earles
(74) *Attorney, Agent, or Firm* — Kilpatrick Townsend & Stockton LLP

(57) ABSTRACT

A reconfigurable computer mouse is disclosed. The reconfigurable mouse includes a base module that has a cover disposed in a back section of the base module, a receiving portion of a locking system disposed on a side of the base module, a front sliding lock disposed in a front section proximal to a front edge of the base module, a multi-pivot system disposed in the front section of the base module, and a button clicking module mounted on the multi-pivot system, and a case module formed in shape of a shell, the case module arranged to be placed on the base module and be secured to the base module using a magnetic attaching system and the locking system, where the multi-pivot system is arranged to pivot in front/back and left/right directions.

20 Claims, 10 Drawing Sheets

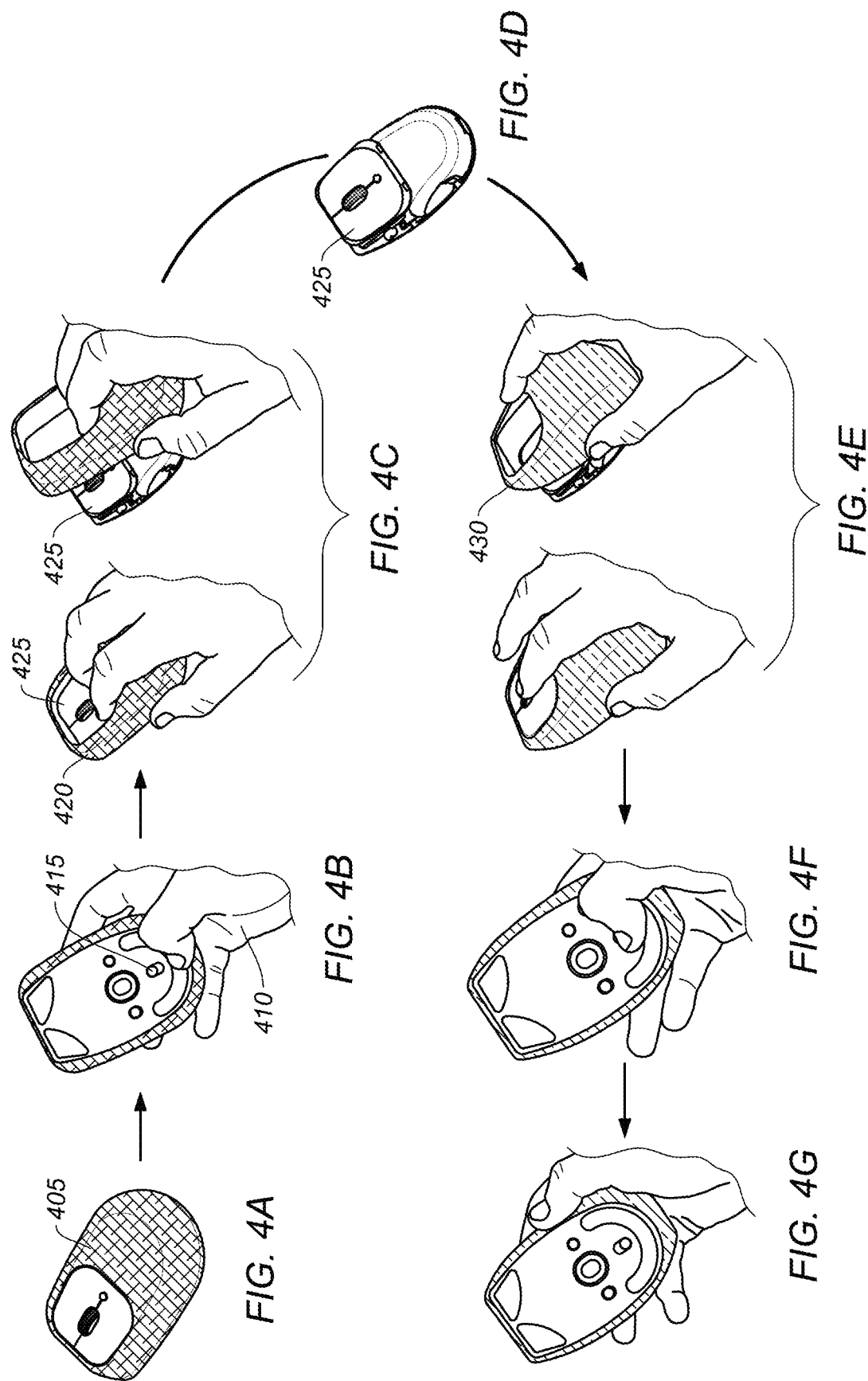

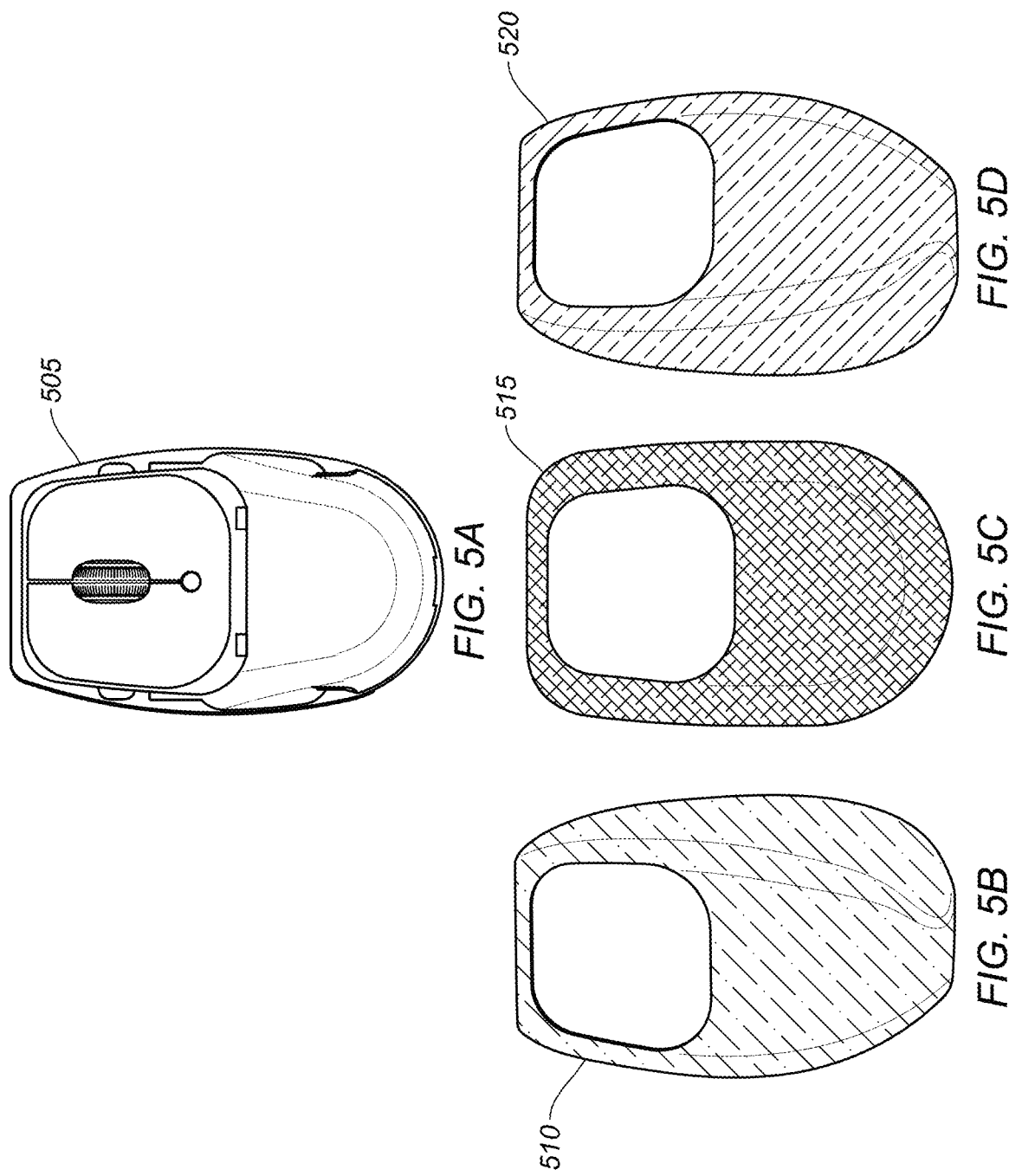

RECONFIGURABLE COMPUTER MOUSE

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktop computers, laptop computers, netbook computers, gaming consoles, tablets and "phablet" computers, smart phones, personal digital assistants, wearable devices (e.g., smart watches, glasses), virtual reality (VR) and/or augmented reality (AR) headsets and systems, and the like.

Input devices have undergone many marked improvements over the last several decades. In some contemporary input devices, such as computer mice and keyboards, buttons and/or keys often employ contact-based switches for click detection. Contact-based switches have been in the market for many years and have significantly improved in quality and price, but are subject to wear-and-tear over extended use due to repeated contact-based actuation. This can often result in unreliable performance characteristics and low signal-to-noise ratios that would be unacceptable to even casual users, much less those in the more discerning gaming community. As such, better solutions are needed.

Unless otherwise indicated herein, the materials described in this section are not prior art to the claims in this application and are not admitted to be prior art by inclusion in this section.

BRIEF SUMMARY

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

In certain embodiments, a computer mouse comprises: a base module including: a cover disposed in a back section of the base module; a receiving portion of a locking system disposed on a side of the base module; a front sliding lock disposed in a front section proximal to a front edge of the base module; a multi-pivot system disposed in the front section of the base module; and a button clicking module mounted on the multi-pivot system; and a case module formed in shape of a shell, the case module arranged to be placed on the base module and be secured to the base module using a magnetic attaching system and the locking system, where the multi-pivot system is arranged to pivot in front/back and left/right directions.

In some implementations, the case module is a first case module, and the first case module is arranged to be taken off the base module by a user and replaced to a second case module. In some embodiments, the multi-pivot system is arranged to enable the button clicking module to be oriented in any direction and be tilted to various angles of tilt. In various embodiments, the case module includes a front locking portion arranged to attach to the front sliding lock, and wherein the case module further comprises a side tab portion of the locking system. In some embodiments, the magnetic attaching system includes a first magnet disposed in the cover and a second magnet disposed in the case module, and the first and second magnets are arranged such that when the case module is placed on the base module, the first and second magnets magnetically attract each other to secure the case module to the base module. In further embodiments, the multi-pivot system comprises a spring loading module. In some embodiments, the spring loading module includes a first and second spring blades. In yet further embodiments, the spring loading module is arranged to exert a force on the button clicking module such that the button clicking module is positioned in a neutral position when the case module is placed on the base module. In some aspects, the spring loading module is arranged to exert a force on the button clicking module such that the case module pops off when the locking system is released.

In further embodiments, a computer mouse comprises: a base module including: a cover disposed in a back section of the base module; a receiving portion of a locking system disposed on a side of the base module; a front sliding lock disposed in a front section proximal to a front edge of the base module; a multi-pivot system disposed in the front section of the base module; and a button clicking module mounted on the multi-pivot system; and a case module formed in shape of a shell, the case module arranged to be placed on the base module and be secured to the base module using a magnetic attaching system and the locking system, where the multi-pivot system comprises a spring loading module.

In some implementations, the spring loading module comprises a first and second spring blades. In some embodiments, the spring loading module is arranged to exert a force on the button clicking module such that the button clicking module is positioned in a neutral position when the case module is placed on the base module. In various embodiments, the spring loading module is arranged to exert a force on the button clicking module such that the case module pops off when the locking system is released. In some aspects, the button clicking module comprises keyplates and a scroll wheel. In some embodiments, the locking system comprises a slider arranged to be slid between a first position and a second position to lock/unlock the case module.

In yet further embodiments, a computer mouse comprises: a base module including: a cover disposed in a back section of the base module; a receiving portion of a locking system disposed on a side of the base module; a front sliding lock disposed in a front section proximal to a front edge of the base module; a multi-pivot system disposed in the front section of the base module; and a button clicking module mounted on the multi-pivot system; and a case module formed in shape of a shell, the case module arranged to be placed on the base module and be secured to the base module using a magnetic attaching system and the locking system, where the locking system comprises a slider arranged to be slid between a first position and a second position to lock/unlock the case module, and where the slider is accessible via a bottom surface of the computer mouse.

In some implementations, the multi-pivot system comprises a spring loading module. In some embodiments, the spring loading module comprises a first and second spring blades. In various embodiments, the spring loading module is arranged to exert a force on the button clicking module such that the button clicking module is positioned in a neutral position when the case module is placed on the base module. In some aspects, the spring loading module is arranged to exert a force on the button clicking module such that the case module pops off when the locking system is released.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings, in which:

FIG. 4A shows a reconfigurable computer mouse, according to certain embodiments. FIGS. 4B-4G show a sequence of steps for changing a cover of the reconfigurable computer mouse, according to certain embodiments.

FIG. 5A shows a plan view of a base module according to certain embodiments. FIGS. 5B-5D show plan view of various top-case implementations, according to certain embodiments.

DETAILED DESCRIPTION

Figure 1:
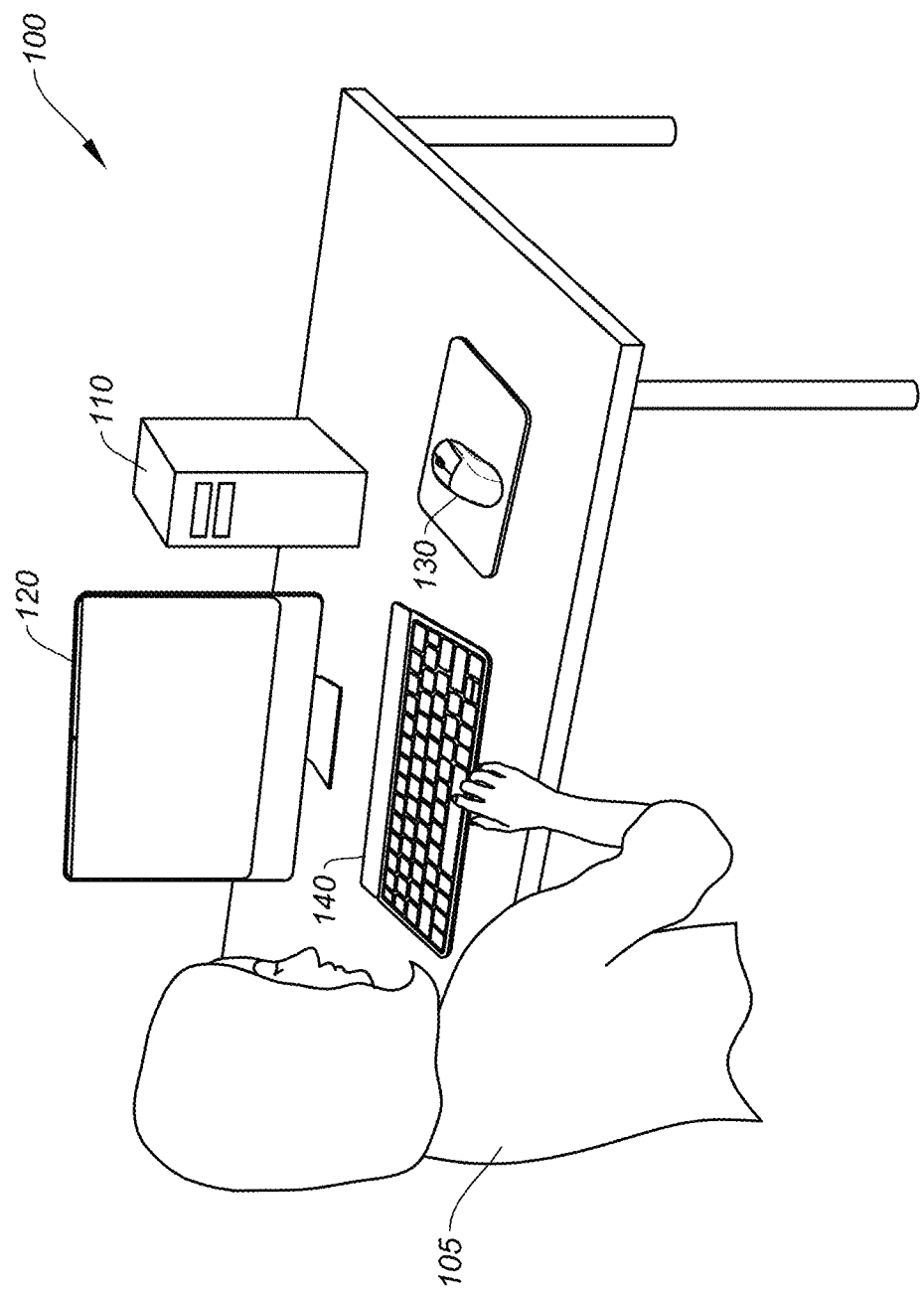
FIG. 1 shows an example of a computer system that can include any of a variety of host computing devices and computer peripheral devices, including computer peripheral devices (e.g., a computer mouse, keyboard, etc.) that can be configured to perform aspects of the various inventive concepts described herein.

Aspects of the present disclosure relate generally to electronic devices, and more particularly to modular computer peripheral devices that are user reconfigurable, according to certain embodiments.

In the following description, various examples of reconfigurable computer peripheral devices are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the disclosure relate to various improved reconfigurable computer peripheral devices (also referred to as input devices) that incorporate a case module and a base module, as described in the embodiments that follow.

An input device, as noted above, is typically used to convert human-induced analog inputs (e.g., touches, clicks, motions, touch gestures, button presses, scroll wheel rotations, etc.) made in conjunction with the input device into digital signals for computer processing. A button (e.g., used in a computer mouse, remote control, game controller, etc.) or key (e.g., used on a keyboard) are common depressible elements that can be depressed by a user to instantiate a type of control signal (e.g., an alphanumeric character, a left/right mouse button, a trigger, etc.). For a button, in many contemporary computer mice, the button "click" detection is typically based on a type of contact-based switch, such as a galvanic or electric switch, where a physical contact between two elements causes the input device to generate a control signal (e.g., a button click). These types of switches have been used for many decades and, through continued innovation, have seen improvements in longevity, reliability, and price.

In some embodiments, a reconfigurable computer mouse can include a case module and a base module. The case module may also be referred to as top-case, cover, or a shell. The reconfigurable computer mouse can be reconfigured by replacing one cover with another cover to change a size, shape, right-handed/left-handed orientation, a tilt, or color of the mouse. The case module can be snapped onto the base module and can have various shapes, orientation angles, colors and sizes. The base module can include electrical components, an orientable clicking and scrolling module, and a multi-pivot system. In various embodiments, the reconfigurable computer mouse can allow a user to choose a shape and size of the mouse, and whether the mouse is right-handed or left-handed and whether the mouse is tilted forward or backward. The user can reconfigure the mouse into a desired configuration using one hand and without using a tool.

In various embodiments, the base module can include an orientable clicking and scrolling module giving the user an opportunity to have a true left-handed mouse. In some embodiments, the multi-pivot system can provide robust pivotability for the clicking and scrolling module. The clicking and scrolling module can be mounted on the multi-pivot system, thereby allowing tilting of keyplates of the clicking and scrolling module (left/right and front/back) to match a shape of the case module. In some embodiments, the case module can be snapped onto the base module and held in place using magnets that are included in the case module and in the base module. The case module can then be secured to the base module using a multiple-point lock system. In various embodiments, the case module is arranged to be placed on the base module and be secured to the base module using a magnetic attaching system and a locking system. In some embodiments, the case module is arranged to be placed on the base module and be secured to the base module using a magnetic attaching system, while in alternative embodiments, the case module is arranged to be placed on the base module and be secured to the base module using a locking system.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices communicatively coupled to and integrated with the host computing device, including a display device 120, a computer mouse 130, a keyboard 140, and may include any other suitable input device. Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or both of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, CAD controller, joystick, simulation shifter, stylus device, or other suitable device that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art.

An input device may be a computer peripheral device, and may be referred to as either herein, as well as a "peripheral input device," "peripheral," or the like. The majority of the embodiments described herein generally refer to computer peripheral devices 130-140, however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
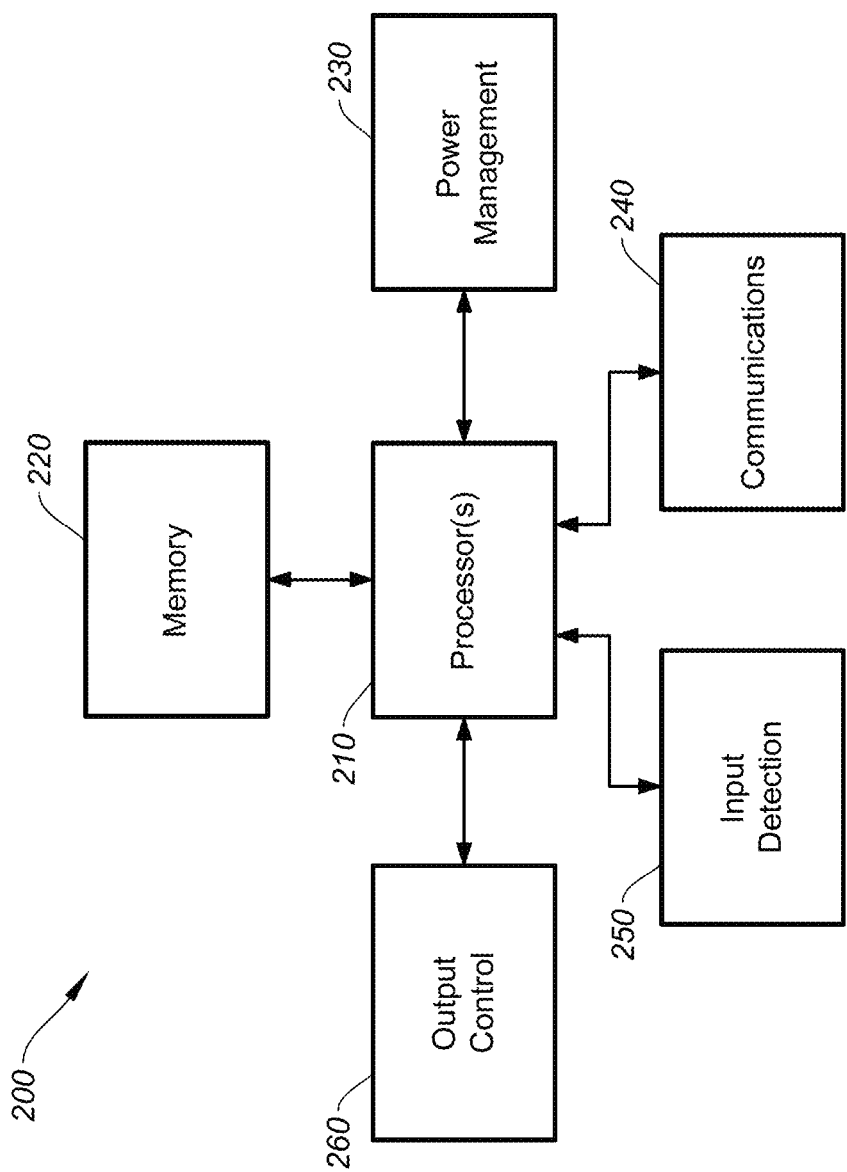
FIG. 2 shows a simplified diagram of a system configured for operating an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system modules 220-260 can be in electronic communication with processor(s) 210 (e.g., via a bus system). System 200 may include additional functional modules that are not shown or discussed to prevent obfuscation of the novel features described herein. System modules 220-260 may be implemented as separate modules, or alternatively, more than one system module may be implemented in a single module. In the context described herein, system 200 can be incorporated into any input device described or mentioned herein and may be further configured with any of the reconfigurable computer peripheral device implementations presented herein, as described below at least with respect to FIGS. 4A-10, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system module 220-260). Alternatively or additionally, some of system modules 220-260 may include an additional dedicated processor, which may work in conjunction with processor(s) 210. For instance, MCUs, μCs, DSPs, and the like, may be configured in other system modules of system 200. Communications module 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., methods 600) described and/or covered by this disclosure in conjunction with any other system modules in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory module ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory 220 can store the various data described throughout this disclosure. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled switches, etc.) as described herein.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications module 240, etc.). In certain embodiments, the functions provided by power management system 230 may be incorporated into processor(s) 210. Alternatively, some embodiments may not include a dedicated power management module. For example, functional aspects of power management module 240 may be subsumed by another module (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally include a hardwired connection to the corresponding host computing device. For example, input device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other modules described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection module 250 can include one or more touch sensitive surfaces or touch sensors. Touch sensors generally include sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection module 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-module that can be configured to detect a relative displacement (movement tracking) of the computer peripheral device 150. For example, input detection module 250 optical sensor(s) such as IR LEDs and an imaging array of photodiodes to detect a movement of computer peripheral device 150 relative to an underlying surface. Computer peripheral device 150 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface") and can send that data to processor 210 for further processing. In some embodiments, processor 210, the movement tracking module (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 150. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular modules, it is to be understood that these modules are defined for convenience of description and are not intended to imply a particular physical arrangement of component parts. Further, the modules need not correspond to physically distinct components. Modules can be configured to perform various operations, e.g., by programming a processor or providing appropriate control circuitry, and various modules might or might not be reconfigurable depending on how the initial configuration is obtained.

Embodiments of the present disclosure can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
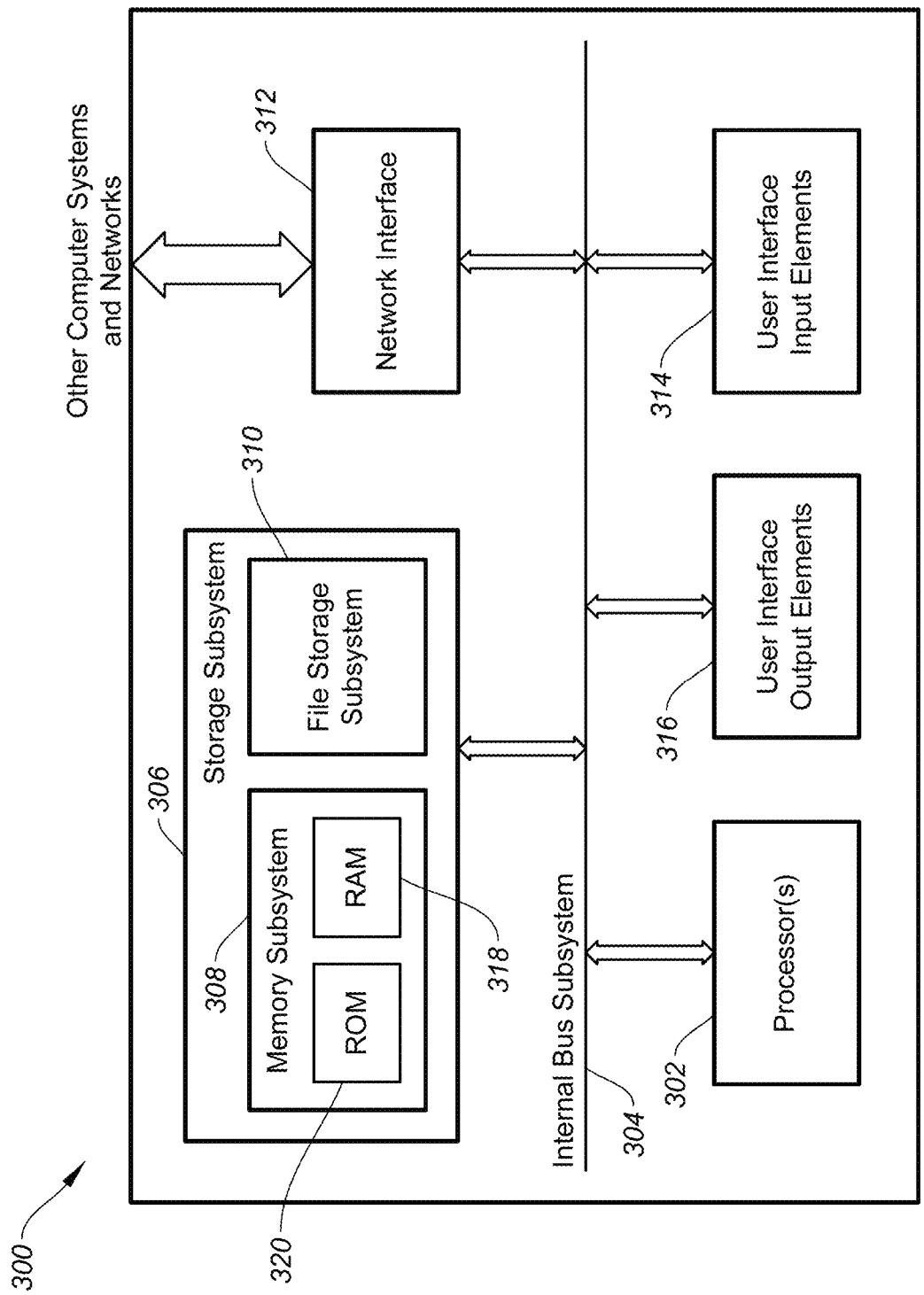
FIG. 3 shows a simplified diagram of a system for operating a host computing device, according to certain embodiments.

FIG. 3 is a simplified diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop computing device 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the disclosure (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, modules, steps and means described throughout the present disclosure may be done in various ways. For example, these techniques, modules, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may include sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular modules, it is to be understood that these modules are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the modules need not correspond to physically distinct components. Modules can be configured to perform various operations, e.g., by programming a processor or providing appropriate control circuitry, and various modules might or might not be reconfigurable depending on how an initial configuration is obtained. Embodiments of the present disclosure can be realized in a variety of apparatus including electronic devices implemented using a combination of circuitry and software. Host computing devices or even peripheral devices described herein can be implemented using system 300.

Reconfigurable Computer Mouse

FIG. 4A shows a reconfigurable computer mouse, according to certain embodiments. FIG. 4A shows a reconfigurable mouse that can have its cover changed relatively easily. FIGS. 4B-4G show a sequence of steps for changing the cover of the reconfigurable computer mouse, according to certain embodiments. FIG. 4A shows a reconfigurable mouse 405 with a flat case module (or top-case), where the flat case module has a yellow color. FIG. 4B shows a user 410 starting a process of changing the top-case. In FIG. 4B, the user 410 can pick up the reconfigurable mouse 405 and flip it showing a view of a bottom section of the reconfigurable mouse 405. The user 410 can then unlock the top-case from the base module by sliding down a sliding lock actuator 415 (the locking system is described in further detail in FIG. 7). FIG. 4C shows the user 410 pressing down on the base module 425 while lifting up the top-case 420 and separating the top-case 420 from the base module 425.

FIG. 4D shows the base module 425 where the top-case 420 has been removed. In FIG. 4E, the user 410 can place a different top-case 430 on the base module 425. In the illustrated embodiment, the top-case 430 is a right-handed top-case having a blue color. In various embodiments, the top-case can be left-handed or right-handed, have a forward tilt or a backward tilt, or have other configurations that suits a specific application. FIG. 4F shows the user locking the top-case 430 onto the base module 425 by sliding up the sliding lock actuator 415. FIG. 4G shows the reconfigurable mouse 405 with the top-case 430. In the illustrated embodiment, the user 410 can change the top-cases relatively easily using one hand. Any suitable top-case shape, size, and/or orientation can be used as would be appreciated by one of ordinary skill in the art with the benefit of this disclosure.

FIG. 5A shows a plan view of a base module 505, and FIGS. 5B-5D show plan view of various top-case implementations, according to certain embodiments. FIG. 5B shows a left-handed top-case 510, FIG. 5C shows a flat top-case 515 and FIG. 5D shows a right-handed top-case 520. Each top-case can be placed onto the base module 505 to form the reconfigurable mouse. In various embodiments, the top-case can have various shapes and sizes that can accommodate different shapes and sizes of hands and different grip styles, including, but not limited to, claw grips, palm grips and fingertip grips. In some embodiments, the top-case may have various color, material and finish (CMF) to suit a user's taste.

Figure 6A:
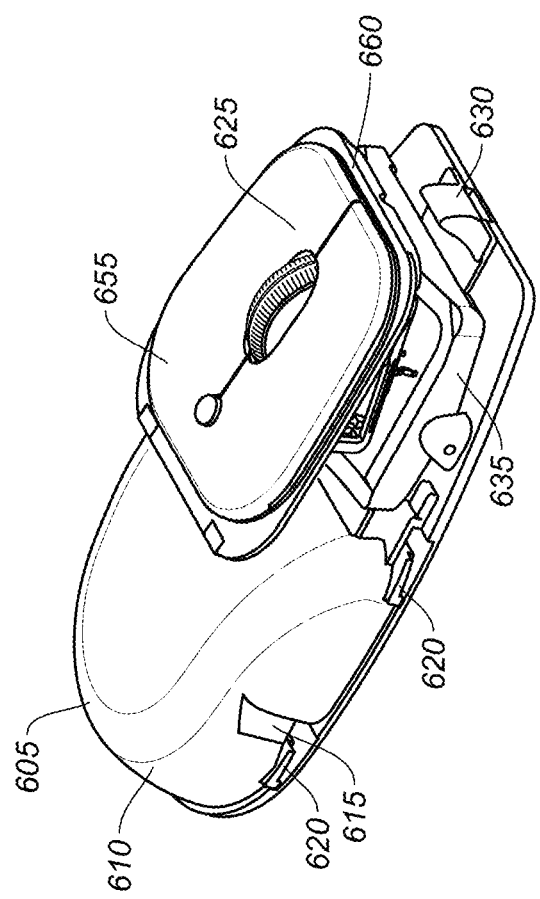
FIG. 6A shows details of a base module, according to certain embodiments.

FIG. 6A shows details of a base module 605, according to certain embodiments. As illustrated in FIG. 6A, the base module 605 can include a top-case holding 610, a magnet, battery and printed circuit board (PCB) cover 615, sliding locks 620, an orientable clicking and scrolling module 625, a front sliding lock 630 and a multi-pivot system 635. The orientable clicking and scrolling module 625 may also be referred to as button clicking module or clicking module. The clicking and scrolling module 625 can house the left, right, middle and dots-per-inch (DPI) switches and the scroll encoder. The multi-pivot system 635 can allow the clicking and scrolling module 625 to tilt (front/back and left/right), thereby allowing the keyplates 655 to be oriented according to a shape of the top-case.

In some embodiments, the multi-pivot system 635 can be fixed, while in alternative embodiments the multi-pivot system 635 can be arranged to move back and forth. In various embodiments, the multi-pivot system 635 can be disposed on a sloped surface such that it can change its angle. In some embodiments, the multi-pivot system 635 can be arranged to accommodate whatever shape a top-case may have. Thus, if the top-case is left-handed or right-handed, the multi-pivot system can tilt one way or the other in order to accommodate the top-case. In various embodiments, the clicking module is arranged to have a range of tilting angles, for example, the clicking module may tilt between 20°-70° angle for the left/right rotation and angle for the front/back rotation. In some embodiments, the angle for the left/right rotation can be 30°-60°, and 10°-20° for the front/back rotation, while in other embodiments the clicking module may tilt between 35°-50° angle for the left/right rotation and 12°-18° angle for the front/back rotation.

Figure 6C:
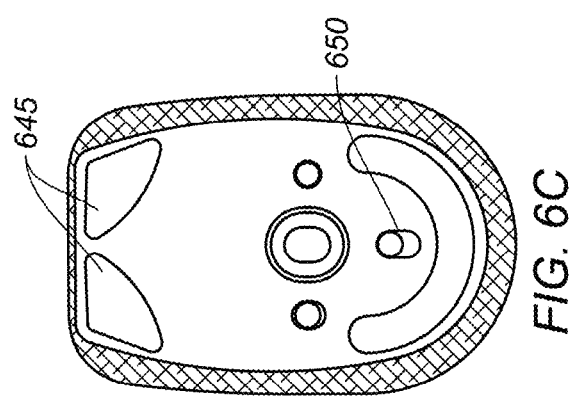
FIGS. 6B-6C show top and bottom views of the reconfigurable computer mouse, according to certain embodiments.
Figure 6B:
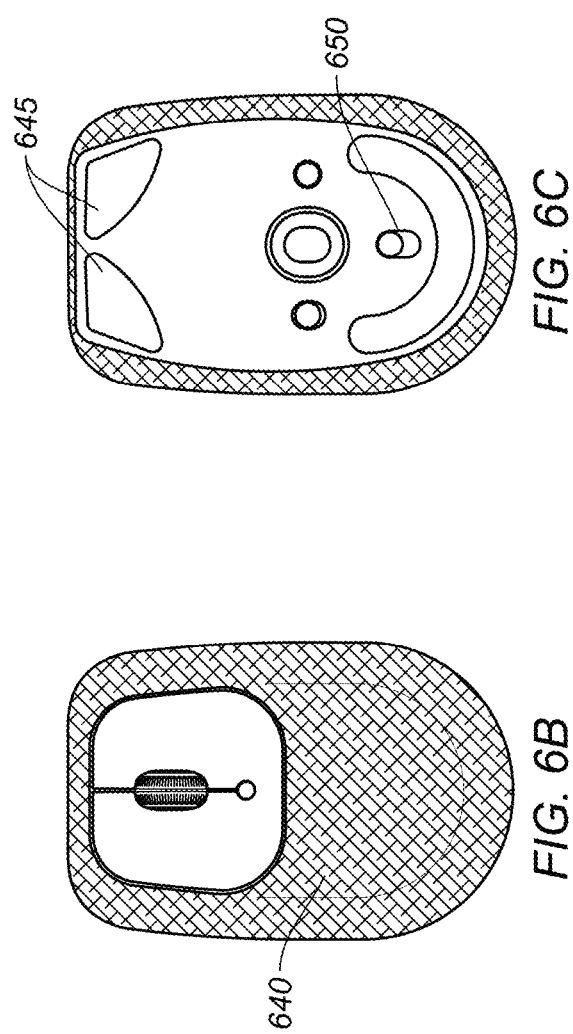

FIGS. 6B-6C show top and bottom views of a reconfigurable mouse, according to certain embodiments. FIG. 6B shows a top view of the reconfigurable mouse with a flat top-case 640. FIG. 6C shows a bottom view of the reconfigurable mouse illustrating pads 645 located on the bottom of the base module 605, and a sliding lock actuator 650 located at the bottom of the base module 605.

Figure 7:
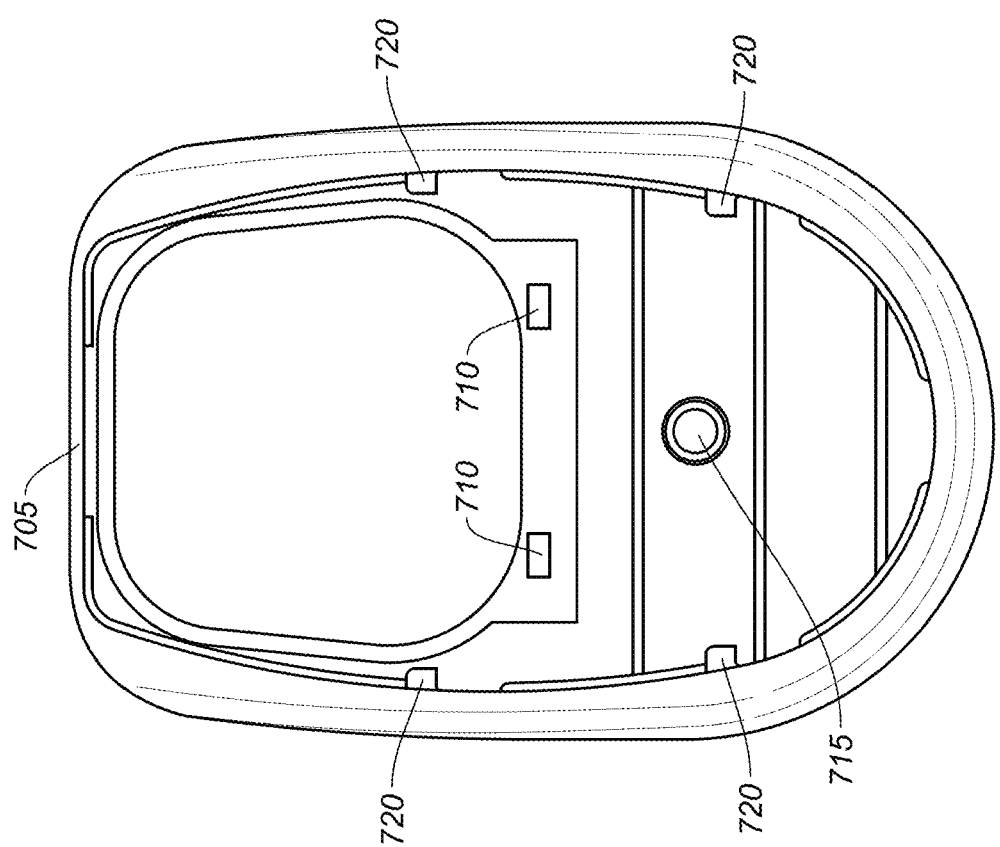
FIG. 7 shows further details of a top-case having a multi-point locking system and a magnet holding system, according to certain embodiments.

FIG. 7 shows further details of a top-case having a multi-point locking system and a magnet holding system, according to certain embodiments. FIG. 7 shows a bottom view of the top-case. In the illustrated embodiment, a top-case can include a multi-point locking system that has a front locking point 705, and multiple side locking points 720. In the illustrated embodiments, four side locking points are shown. In some embodiments, the top-case may include two side locking points, while in other embodiments the top-case may include three locking points. The top-case can further include clicking module magnets 710 and top-case holding magnet 715. The clicking module magnets 710 are arranged to be paired with magnets in the clicking module, such that the top case is held in place to the clicking module. The multi-point locking system and magnet holding system can enable proper orientation of the clicking module, and can enable the top-case to be held in place. The magnet holding system can improve a user's experience by easing the top-case setup onto the base module. Moreover, the multi-point locking system can secure the top-case onto the base module.

The top-case is first attached to the base module by the magnet holding system when a top-case is placed on a base module, and then the top-case is secured to the base module by the multi-point locking system. The side locking points 720 can be placed, for example, midway along the body of the top-case. In some embodiments, the side locking points can be placed three quarters of the way towards the back along the body of the top-case. Any suitable location along the body of the tope-case can be used as would be appreciated by one of ordinary skill in the art with the benefit of this disclosure. The multi-point lock system can be arranged to open when the sliding lock actuator is slid down, so that the top-case may pop off the base module. The side locking points can include a tab structure, and the base module can include a receiving portion for receiving each tab of the top-case locking points. In various embodiments, the top-case is arranged to secure the multi-pivot system in a specific orientation in order to prevent rotation and/or translation such that it locks in place.

Figure 8A:
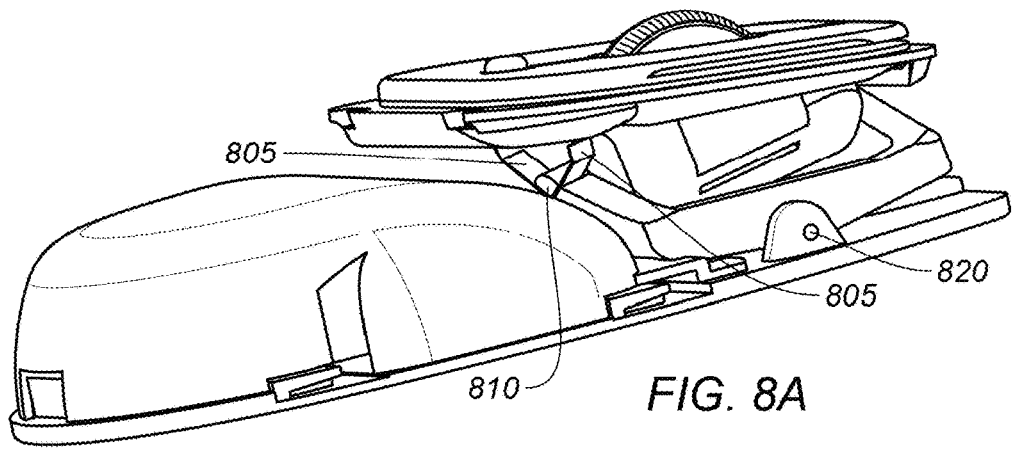
FIGS. 8A-8C show details of a spring system, according to certain embodiments.
Figure 8B:
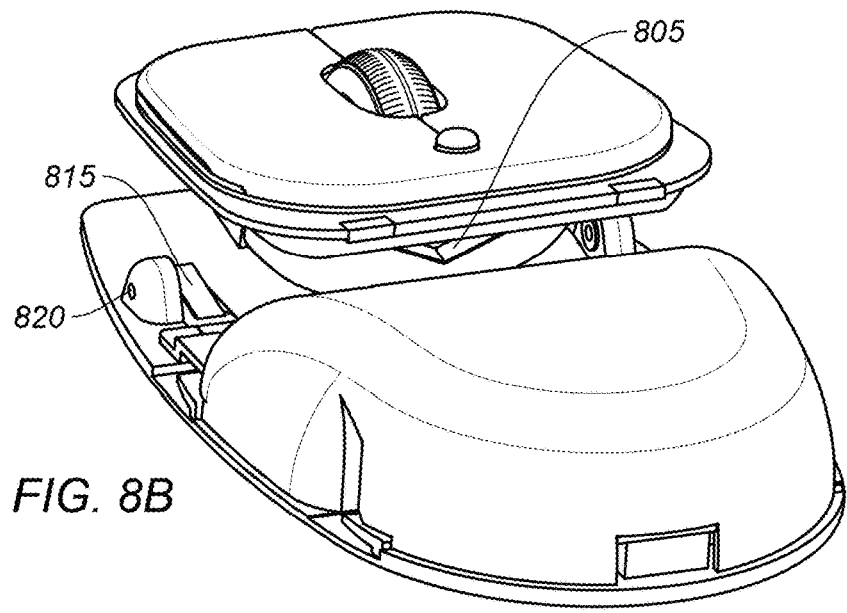
Figure 8C:
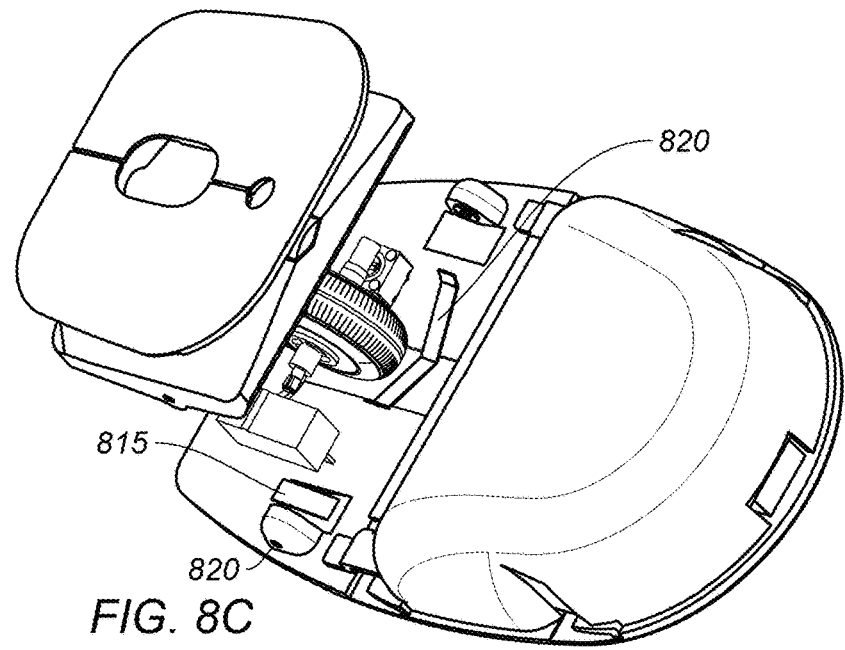

FIGS. 8A-8C illustrate details of a spring system, according to certain embodiments. In the illustrated embodiment, base module 605 is shown to include a left/right spring blade 805, a left/right hinge axel 810, a front/back spring blade 815 and a front/back hinge axel 820. The left/right spring blade 805 and the front/back spring blade 815 are arranged to position the clicking module 625 in a center (or neutral) position when there is no top-case, and to load the clicking module 625 when a top-case is placed on the base module 605. The two spring blades are arranged to position the clicking module 625 in a neutral position irrespective of whether the top-case is right-handed, left-handed, or flat. The two spring blades are also arranged to allow the clicking module 625 to tilt back. The spring blade system is arranged to put a load onto the clicking module 625 such that when a top-case is skewed one way or the other, a restoring force is exerted onto the clicking module 625 to bring it back into a neutral position. Furthermore, the loading force on the clicking module can cause the clicking module to pop off as soon as the top-case is unlocked. In some embodiments, the spring blade system can allow restoring titling to neutral position when no top-case is on the mouse. This is done to make it relatively easy to position another top-case on the mouse and to prevent it from being skewed. In various embodiments, the spring blade system may not exert a preload force to rigidify keyplates, thus there may not be a pop off.

Moreover, by loading the clicking module 625, the spring system can minimize any gap that may exist between the top-case and the base module, thereby minimizing any instability in the reconfigurable mouse. In this way, when there is a top-case on, the spring blades can prevent a play of the top-case, thereby increasing the robustness of the reconfigurable mouse. A computer mouse can be often get used daily and sometimes more than 8 hours per day, therefore it is important to have a mouse that is robust. It will be apparent to one skilled in the art that a positioning system for the clicking module 625 can be implemented by other means, such as, but not limited to, a ball joint and set a of springs, for example, spring blades, compression springs, and/or torsion springs. The ball joint and spring system can keep the clicking module straight. In some embodiments, the positioning system for the clicking module 625 can only include springs that are arranged to maintain, tilt, and load the clicking module. In various embodiments, the positioning system may include a base and may be formed in a single part along with the clicking module using a flexible joint. In some embodiments, the positioning system for the clicking module 625 may be an elastomer tilting system. An elastomer tilting system may include, for example, but not limited to, a piece of rubber that can be placed underneath the clicking module 625.

The reconfigurable mouse is made robust by having a combination of a lip around the clicking module that can be in direct contact with the top-case when the top-case is on, a multi-point locking system, and the spring blade loading system. These elements can prevent all the degrees of freedom of play of the clicking module. Each lock of the multi-point locking system can be equipped with a wedge that pushes back into an unlock position. In some embodiments, the multi-point locking system can include three locking points. In various embodiments, the multi-point locking system may include four or five locking points.

Figure 9:
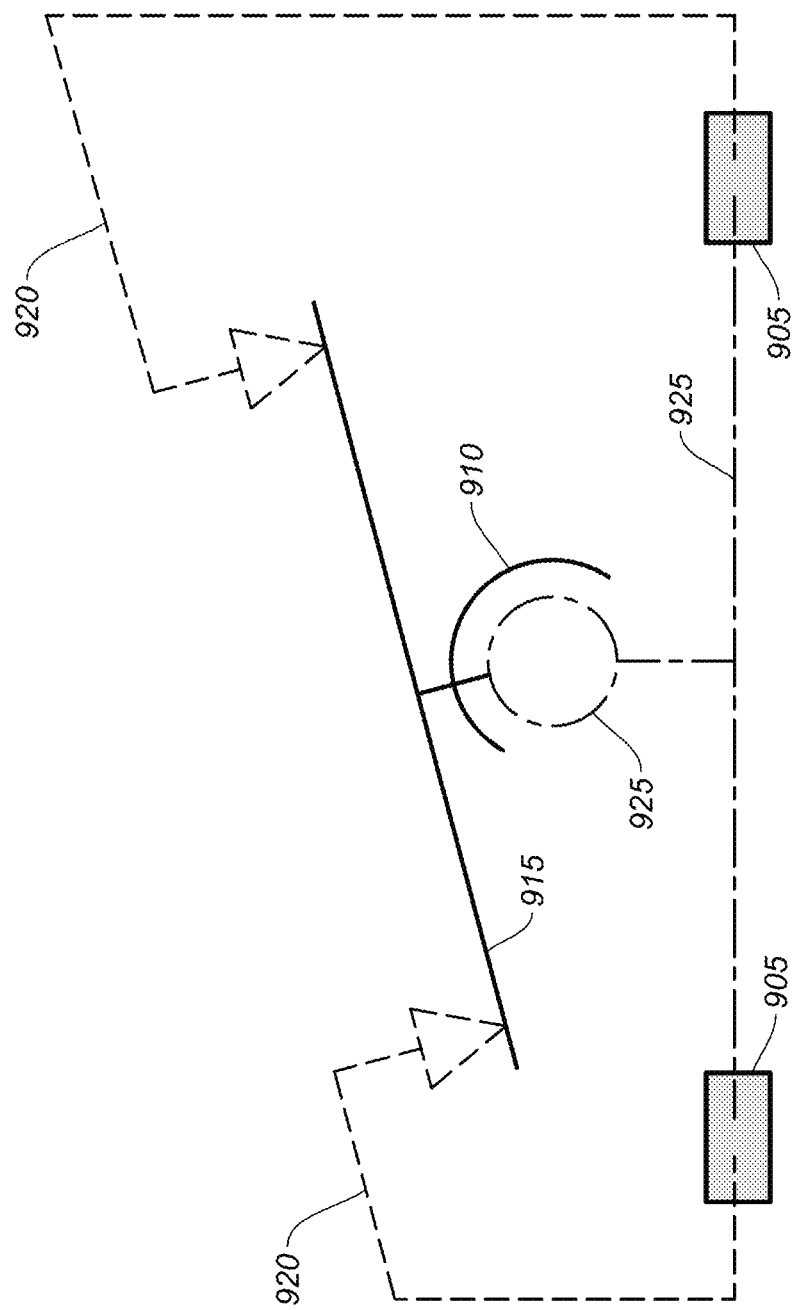
FIG. 9 shows a diagram of elements of a reconfigurable computer mouse, according to certain embodiments.

FIG. 9 illustrates a diagram of elements of a reconfigurable mouse, according to certain embodiments. As shown in FIG. 9, the reconfigurable mouse can include locking system 905, spring system 910, clicking module 915, top-case 920, and a base module 925. The bottom case can be linked to clicking module 915 through a pivot linkage and to top-case 920 through the locking mechanism. FIG. 9 illustrates one possible rotation out of two possible rotations of the reconfigurable mouse. In the illustrated embodiment, the circle represents a pivot between clicking module 915 and lower part of base module 925. This pivot can be formed elastic by the spring system 910. In the illustrated embodiment, one pivot is shown for the sake of simplicity but this pivot can include two pivots (or multi pivots, hence multi-pivot system), thus there can be two possible rotations. In some embodiments, the multi-pivot system can include two pivots that are angled at 90° and can be form to a universal joint. In various embodiments, the reconfigurable mouse may include a single-pivot system that is arranged to tilt left or right.

When the locking system 905 is activated, top-case 920 and lower part of base module 925 can be rigidly linked and the system becomes statically indeterminate, i.e., the pivot does not allow for any movement. The clicking module 915 is then rigid due to the locking system 905. The working mechanism is the same for the other possible rotation. It will be understood by one skill in the art having the benefit of this disclosure that embodiments of the disclosure can enable more than two possible rotations and those are within the scope of this disclosure.

Figure 10:
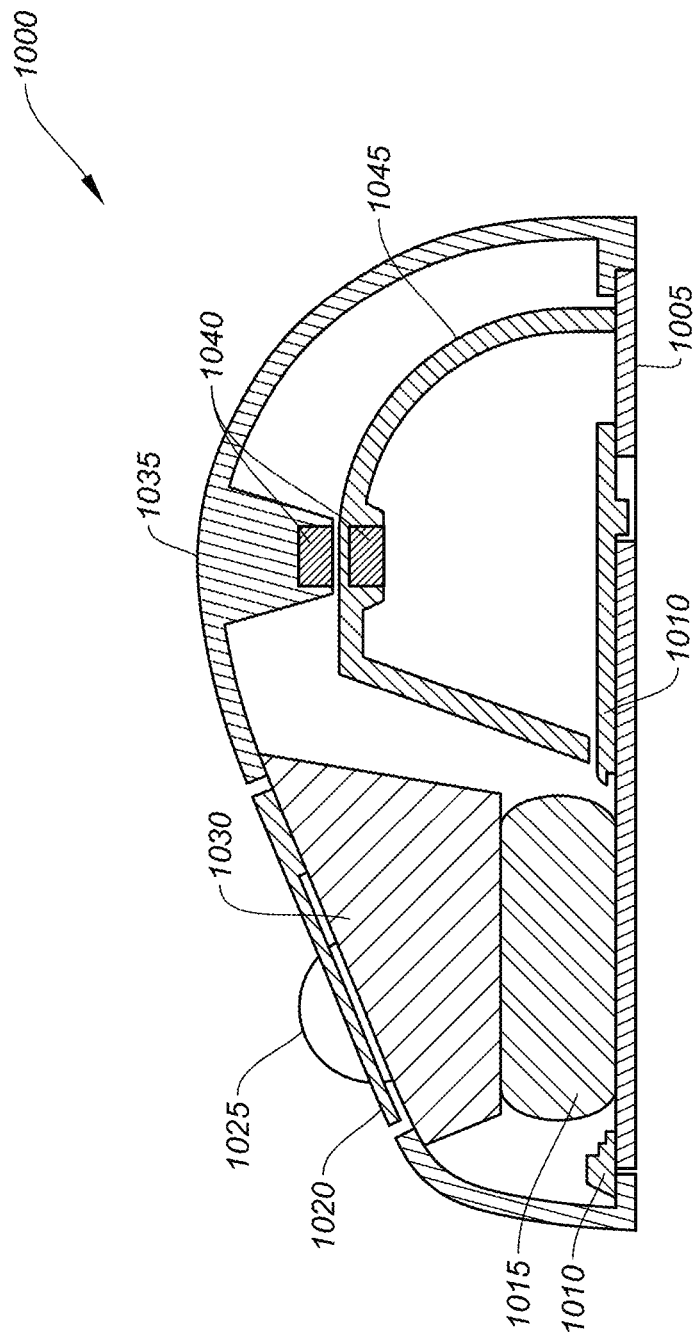
FIG. 10 shows an alternative reconfigurable computer mouse, according to certain embodiments.

FIG. 10 illustrates a reconfigurable mouse 1000, according to certain embodiments. In the illustrated embodiment, the reconfigurable mouse 1000 can include a base module 1005, locking system 1010, elastomer tilting system 1015, keyplates 1020, scroll wheel 1025, clicking module 1030, top-case 1035, main magnets 1040, and a battery and PCB cover 1045 that is arranged to function as main magnet holder. The locking system can lock the top-case 1035 onto the base module 1005. The elastomer tilting system 1015 is arranged to enable titling and loading of the clicking module 1030 such that the clicking module 1030 is positioned in a neutral position. Main magnets 1040 can enable proper orientation of the clicking module 1030 and can enable the top-case 1035 to be held in place. The battery and PCB cover 1045 provides a cover for the battery and PCB and can hold the main magnets.

In some embodiments, an identification system can be included in a reconfigurable mouse, according to certain embodiments. The identification system can be arranged to relay to identification data such as shape, right-handed/left-handed information, tilt angle, orientation of a top-case and whether the top-case is on or not to the computing device 110. Based on receiving such data, the computing device 110 may change the software configuration of the reconfigurable mouse, for example, change the mouse from a right-hand configuration to a left-hand configuration by switching the left and right buttons, and vice versa. In some embodiments, the computing device 110 may create a gaming focused configuration or an ergonomic or consumer focused configuration, and change the DPI settings or other functions of the mouse based on the relayed information. In various embodiments, the relaying system can be included in the top-case or in the base module. In some embodiments, when the relaying system is included in the top-case, the base module may detect the data relayed from the top-case. In some embodiments, the reconfigurable mouse itself can change its software configuration. The identification system can include a radio frequency identification (RFID) IC that may be included in the top-case and/or the base module. In various embodiments, the base module may include a tilt sensor.

In some embodiments, the top-case and the base module may include contact pins such as, but not limited to, pogo pins. In various embodiments, the base module can include angle sensors in the hinges in order to identify the clicking module's angular position. In some embodiments, the reconfigurable mouse may include a lighting using a pipe system that can channel light from the base module to the top-case thereby keeping all electronic components in the base module. In various embodiments, the top-case may include electronic features such as, but not limited to, side buttons, additional buttons, side scroll, and lighting. In some embodiments, the top-case may be connected to the base module using direct contact pins or USB.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
    a base module including:
        a cover disposed in a back section of the base module;
        a receiving portion of a locking system disposed on a side of the base module;
        a front sliding lock disposed in a front section proximal to a front edge of the base module;
        a multi-pivot system disposed in the front section of the base module; and
        a button clicking module mounted on the multi-pivot system; and
    a case module formed in shape of a shell, the case module arranged to be placed on the base module and be secured to the base module using a magnetic attaching system and the locking system,
    wherein the multi-pivot system is arranged to pivot in front/back and left/right directions.

2. The computer mouse of claim 1, wherein the case module is a first case module, and wherein the first case module is arranged to be taken off the base module by a user and replaced to a second case module.

3. The computer mouse of claim 1, wherein the multi-pivot system is arranged to enable the button clicking module to be oriented in any direction and be tilted to various angles of tilt.

4. The computer mouse of claim 1, wherein the case module comprises a front locking portion arranged to attach to the front sliding lock, and wherein the case module further comprises a side tab portion of the locking system.

5. The computer mouse of claim 1, wherein the magnetic attaching system comprises a first magnet disposed in the cover and a second magnet disposed in the case module, and wherein the first and second magnets are arranged such that when the case module is placed on the base module, the first and second magnets magnetically attract each other to secure the case module to the base module.

6. The computer mouse of claim 1, wherein the multi-pivot system comprises a spring loading module.

7. The computer mouse of claim 6, wherein the spring loading module comprises a first and second spring blades.

8. The computer mouse of claim 6, wherein the spring loading module is arranged to exert a force on the button clicking module such that the button clicking module is positioned in a neutral position when the case module is placed on the base module.

9. The computer mouse of claim 6, wherein the spring loading module is arranged to exert a force on the button clicking module such that the case module pops off when the locking system is released.

10. A computer mouse comprising:
    a base module including:
        a cover disposed in a back section of the base module;
        a receiving portion of a locking system disposed on a side of the base module;
        a front sliding lock disposed in a front section proximal to a front edge of the base module;
        a multi-pivot system disposed in the front section of the base module; and
        a button clicking module mounted on the multi-pivot system; and
    a case module formed in shape of a shell, the case module arranged to be placed on the base module and be secured to the base module using a magnetic attaching system and the locking system,
    wherein the multi-pivot system comprises a spring loading module.

11. The computer mouse of claim 10, wherein the spring loading module comprises a first and second spring blades.

12. The computer mouse of claim 10, wherein the spring loading module is arranged to exert a force on the button clicking module such that the button clicking module is positioned in a neutral position when the case module is placed on the base module.

13. The computer mouse of claim 10, wherein the spring loading module is arranged to exert a force on the button clicking module such that the case module pops off when the locking system is released.

14. The computer mouse of claim 10, wherein the button clicking module comprises keyplates and a scroll wheel.

15. The computer mouse of claim 14, wherein the locking system comprises a slider arranged to be slid between a first position and a second position to lock/unlock the case module.

16. A computer mouse comprising:
    a base module including:
        a cover disposed in a back section of the base module;
        a receiving portion of a locking system disposed on a side of the base module;
        a front sliding lock disposed in a front section proximal to a front edge of the base module;
        a multi-pivot system disposed in the front section of the base module; and
        a button clicking module mounted on the multi-pivot system; and
    a case module formed in shape of a shell, the case module arranged to be placed on the base module and be secured to the base module using a magnetic attaching system and the locking system, wherein the locking system comprises a slider arranged to be slid between a first position and a second position to lock/unlock the case module, and wherein the slider is accessible via a bottom surface of the computer mouse.

17. The computer mouse of claim 16, wherein the multi-pivot system comprises a spring loading module.

18. The computer mouse of claim 17, wherein the spring loading module comprises a first and second spring blades.

19. The computer mouse of claim 17, wherein the spring loading module is arranged to exert a force on the button clicking module such that the button clicking module is positioned in a neutral position when the case module is placed on the base module.

20. The computer mouse of claim 17, wherein the spring loading module is arranged to exert a force on the button clicking module such that the case module pops off when the locking system is released.

* * * * *